Patented Aug. 7, 1945

2,381,019

UNITED STATES PATENT OFFICE 2,381,019

PRESERVED CRAB MEAT AND PROCESS OF PRESERVING

Henry F. Webb, St. Louis, Mo.

No Drawing. Application October 31, 1940, Serial No. 363,787

11 Claims. (Cl. 99—188)

This invention relates to a process of treating and preserving crab meat, more particularly the meat of the common or blue crab (*Callinectes sapidus*) which is indigenous to the Chesapeake Bay and other parts of the Atlantic coast.

The principal difficulty heretofore encountered in preserving such crab meat in cans or jars has been the discoloration of the meat which renders the product unsightly and unmarketable.

This discoloration is a change from the normal white to a dark blue or dark gray and usually occurs throughout the meat within a few days after packaging.

I have discovered that discoloration is due to chemical reactions which occur because of the presence in the crab meat of sulphur compounds. That is, when the crab meat is processed, as by heating, these sulphur compounds break down into sulphides which apparently combine with iron and copper and the objectionable blue and gray streaks in the canned meat result.

The object of this invention is to eliminate the possibility of any substantial amount of sulphur compounds forming into sulphides, during heat processing of the crab meat in the can, and then chemically combining with iron and copper present to produce discoloration.

A further object of the invention is to prepare canned crab meat in such a manner that its flavor, texture and appearance are similar to the fresh meat.

Another object of the invention is to impart to the crab meat before it is packaged and processed a pH such as will preclude the formation of sulphides during the cooking treatment. This critical pH I find to be of the order of substantially pH 4.7 to pH 5.0 and in some cases may be as high as pH 5.2. Crab meat which has this pH throughout its mass is free of discoloration after heat processing.

An additional object of the invention is to eliminate the cooking of the crab meat in the presence of a so-called brine or acid. That is, in accordance with this invention, the crab meat having a pH within a critical range is packed into the can in substantially dry condition and is then subjected to cooking or processing. The importance of this is that unless the pH of the meat is properly controlled before packing into the can and cooking, the cooking of the meat in the presence of a brine or acid will not bring the pH down sufficiently to accomplish the elimination of the discoloration factor. In other words, the pH will not be reduced to an extent as will prevent formation of sulphides and their combination with iron and copper which may be present.

As will appear hereinafter, the invention consists in the provision of a solution which will assure that the pH of the crab meat throughout its mass, i. e., interiorly and exteriorly, will be on the acid side before packaging and heat processing. The invention further includes the novel step of imparting to the crab meat a critical pH on the acid side and then packing it into containers while in substantially dry condition. Also the invention embodies a complete process for preserving the crab meat in such a manner that it will stand up under normal or abnormal conditions for a period of years without losing its color, flavor or texture.

As an example of one way in which this process may be carried out, the following procedure may be employed.

The crabs are dressed and washed, preferably in fresh clean water, and are then steamed in the usual manner, preferably from six to eight minutes, after which the meat is picked.

The fresh picked crab meat is immersed in an acid bath, termed Solution A, heated to about 190° F. and having a pH in the neighborhood of pH 2. This bath is formed of an aqueous solution containing approximately 4% sodium chloride and 0.5% of a weak organic acid, as for example, citric acid. In some cases magnesium sulphate ($MgSO_4.7H_2O$) may be included in an amount of about 0.5%. The percentages mentioned are based on the total quantity of water and calculated by weight. Preferably the crab meat is allowed to stand in this solution for about thirty minutes during which time the solution cools down to about 130° F. It is then taken out and the meat squeezed if desired to remove any retained solution or the liquid is drained from the meat in any suitable manner. The meat is then submerged in a second solution termed Solution B, which is the same as the first one above mentioned, but preferably does not include the magnesium sulphate. The treatment in the second solution is identical with that described in connection with the first solution. The meat is then removed from Solution B and mechanically treated, if desired, as for example by squeezing or otherwise drained to remove as much as possible of the liquid (and magnesium sulphate where the same is used) and provide a substantially dry product having the desired critical pH and ready for packaging and processing.

If desired, a single solution may be employed instead of two successive immersion solutions.

but it has been found preferable to use two solutions in that better control is obtained to the end that the crab meat throughout its mass, i. e., both interiorly and exteriorly, will have the desired critical pH on the acid side.

Also, while I have indicated that the baths be of substantially similar composition, it may in some cases be desirable to have the first bath of high concentration and the second bath of lower concentration, whichever way affords the best control and assures that the pH of the crab meat will be within the critical range.

The meat is now ready to be packed in substantially dry condition in glass or metal containers which are sealed under a vacuum of not less than 27½ inches. The containers may be of any desired size but for the purpose of illustrating the preferred sterilization procedure, it will be assumed that they have a capacity of six and one-half ounces.

In accordance with my procedure, the crab meat having a critical pH of substantially pH 4.7 to 5.2, preferably 4.7 to 5.0, and in substantially dry state, is packed into the cans, the cans or jars sealed under vacuum and then cooked, preferably in a hot water cooker or a conventional steam retort at 240° F. for substantially thirty minutes. The containers are then allowed to cool until the temperature drops below or approximately to 100° F. Such processing does not modify the pH of the meat appreciably, the flavor, texture and appearance of the meat are preserved indefinitely, and the product is free of any objectionable discoloration. While I have referred to a temperature of 240° F. for thirty minutes as the cooking step, it is to be understood that this is subject to modification in that a cooking time and temperature which will produce the desired sterilization without objectionable chemical reaction may be employed. The important conditions appear to be (1) the processing of the product in substantially dry condition; (2) the processing of the substantially dry product having a pH which at the processing temperatures and for the processing time periods will inhibit the formation of discoloring sulphides, and (3) the use of temperatures and time periods which will insure a sterilized product in which the quality of the meat is not impaired.

The cooling of the containers constitutes the final step of the process and the hermetically sealed product may be stored for a number of years without the necessity of any special precautions and without deterioration or discoloration.

In connection with the critical pH herein described, my experiments have demonstrated the following: By maintaining the pH within the range of substantially 4.7 to 5.2, preferably as close to pH 4.7 as posssible, i. e., pH 4.7 to 5, a temperature of about 240° F. or slightly thereabove or slightly therebelow, maintained for thirty minutes in a glass or metal container produces no discoloration. By having the pH of the meat as close to pH 4.7 as possible, the results are universally satisfactory, but in some cases due to unusual conditions, a pH above pH 5.0 may produce slight discoloration after standing for some time. Where the pH is in the neighborhood of 5.4 a processing period of thirty minutes produces discoloration. On the other hand when the pH is about 5.4, and the processing is for about twenty minutes, there is frequently no discoloration but apparently this is not a safe treatment in that in some cases discoloration appears.

Where the heat treatment is for only ten minutes, no discoloration is apparent. The ten and twenty minute heating periods, however, may not produce adequate sterilizing unless relatively higher temperatures than 240° F. are used and this is not particularly recommended. Therefore, a heat treatment of about 240° F. for thirty minutes with a pH between 4.7 and 5.2, preferably 4.7 to 5, is the safest and most reliable procedure to assure the elimination of discoloration but a reduced heating period may be used with a lesser acidity provided adequate sterilization can be obtained. The difficulty with a higher temperature is the possibility of causing disintegration of the sulphur compounds and the reaction of sulphides with copper and iron and also the possibility of objectionably affecting the texture of the meat.

In practice, the following formulae for Solutions A and B have been used most successfully:

Solution A
| | | |
|---|---|---|
| Water | gallons | 5 |
| Sodium chloride | ounces | 27 |
| Citric acid crystals | do | 3.5 |
| Magnesium sulphate (optional for Solution A) ($MgSO_4.7H_2O$) | ounces | 3.25 |

Solution B
| | | |
|---|---|---|
| Water | gallons | 5 |
| Sodium chloride | ounces | 27 |
| Citric acid crystals | do | 3.5 |

The purpose of the sodium chloride in the solutions is to impart flavor and hence the amount of salt may be controlled as desired, for example, may be as low as 5 ounces. The purpose of the organic acid is to insure that the meat will acquire the critical pH on the acid side. For the latter purpose, other organic acids than citric acid may be used, as for example, acetic acid. The concentration of these acids are such as to insure the critical pH in the meat.

In connection with the immersion treatments, while I have specified that the baths should be in heated condition, this is not essential in that the baths may be relatively cool, i. e., at room temperature or simply warmed and the meat allowed to remain therein for a sufficiently long time to insure complete penetration and the acquiring by the meat throughout its mass of the critical pH.

The herein described process results in a product which compares more favorably in color, flavor and texture with freshly refrigerated meat than any other process which has heretofore been attempted. It is also more comparable to fresh crab meat inasmuch as the small amount of the salt solution, that is found between the meat and the container, immediately drains from the meat upon opening the container, leaving a dry firm meat. This salt solution is, of course, not added when the crab meat is packed in the container, but the heat draws the solution from the meat during the process of sterilization.

The canned processed crab meat is substantially dry and has a pH which will preclude such chemical action as would cause discoloration of the meat during storage, e. g. substantially pH 4.7 to 5.2. This crab meat may be used in the same manner as fresh meat, without alteration or recipes, due to the fact that the sterilization period is only long enough for preservation and not for the purpose of thorough cooking.

This application is a continuation-in-part of my application Serial No. 239,889, filed November 10, 1938.

I claim:

1. The process of preparing crab meat for packaging and heat processing which comprises immersing the meat in an aqueous acid solution and thereby imparting to the meat throughout its mass a pH on the acid side substantially between the range of pH 4.7 and 5.2, and removing the acid solution from the meat, and canning the meat while it is substantially dry.

2. The process of preparing crab meat for packaging and processing which comprises immersing the meat in an aqueous acid solution and thereby imparting to the meat throughout its mass a pH on the acid side substantially between the range of pH 4.7 and 5.2, and removing solution from the meat to render the meat substantially dry while retaining its pH, and cooking the meat in a container while it is substantially dry.

3. The process of packaging crab meat which comprises immersing the meat in an aqueous acid solution and thereby imparting to the meat throughout its mass a pH on the acid side, removing the solution from the meat, disposing the meat in substantially dry condition in a container, and cooking the meat in such container while retaining substantially the initial pH of the meat.

4. The process of packaging crab meat which comprises immersing the meat in an aqueous acid solution and thereby imparting to the meat throughout its mass a pH on the acid side, removing the solution from the meat, disposing the meat in substantially dry condition in a container, and cooking the meat in such container.

5. The process of packaging crab meat which comprises immersing the meat in an aqueous acid solution and thereby imparting to the meat throughout its mass a pH on the acid side substantially between the range of pH 4.7 and 5.2, removing the solution from the meat, disposing the meat in substantially dry condition in a container, and cooking the meat in such container while retaining substantially the initial pH of the meat.

6. The process of packaging crab meat which comprises immersing the meat in an aqueous acid solution and thereby imparting to the meat throughout its mass a pH on the acid side substantially between the range of pH 4.7 and 5.2, removing the solution from the meat, disposing the meat in substantially dry condition in a container, and cooking the meat in such container.

7. The process of preparing crab meat for packaging and heat processing which comprises immersing the meat in an aqueous solution of an acid and magnesium sulphate and thereby imparting to the meat throughout its mass a pH on the acid side, and removing the solution from the meat, and canning the meat while it is substantially dry.

8. The process of preparing crab meat for packaging and heat processing which comprises immersing the meat in an aqueous acid solution and thereby imparting to the meat throughout its mass a pH on the acid side within a range which will substantially preclude the formation of sulphides, and removing the solution from the meat, and canning the meat while it is substantially dry.

9. The process of packaging crab meat which comprises immersing the meat in an aqueous solution of an acid and thereby imparting to the meat throughout its mass a pH on the acid side within a range which will preclude the formation of sulphides, removing the solution from the meat, disposing the meat in substantially dry condition in a container, and cooking the meat in such container.

10. The process of packaging crab meat which comprises immersing the meat in an aqueous solution of an acid and thereby imparting to the meat throughout its mass a pH on the acid side within a range which will preclude the formation of sulphides, removing the solution from the meat, disposing the meat in substantially dry condition in a container, and cooking the meat in such container while retaining substantially the initial pH of the meat.

11. Canned processed crab meat in substantially dry condition having a pH between substantially 4.7 and 5.2 which precludes discloration of the crab meat.

HENRY F. WEBB.